(12) United States Patent
Minert et al.

(10) Patent No.: US 8,180,662 B2
(45) Date of Patent: May 15, 2012

(54) RAPID DEPLOYMENT OF TRAINING FOR COMPANY REPRESENTATIVES IN CONTACT HANDLING SYSTEMS

(75) Inventors: Brian Douglas Minert, Orem, UT (US); Paul Jarman, Salt Lake City, UT (US); James Andrew Judkins, Centerville, UT (US); Joseph Allan Dean, Crofton, MD (US)

(73) Assignee: Incontact, Inc., Midvale, UT (US)

( * ) Notice: Subject to any disclaimer, the term of this patent is extended or adjusted under 35 U.S.C. 154(b) by 1026 days.

(21) Appl. No.: 12/125,885

(22) Filed: May 22, 2008

(65) Prior Publication Data
US 2009/0089137 A1 Apr. 2, 2009

Related U.S. Application Data

(63) Continuation of application No. 11/869,615, filed on Oct. 9, 2007.

(60) Provisional application No. 60/977,002, filed on Oct. 2, 2007.

(51) Int. Cl.
*G06Q 10/00* (2006.01)
*H04M 3/00* (2006.01)
*H04M 5/00* (2006.01)

(52) U.S. Cl. ............. 705/7.13; 379/265.01; 379/265.02; 379/265.05; 379/25.06; 379/265.08; 379/265.11; 379/265.12

(58) Field of Classification Search ................. 705/7.13; 379/265.01, 265.02, 265.05, 265.06, 265.08, 379/265.11, 265.12
See application file for complete search history.

(56) References Cited

U.S. PATENT DOCUMENTS

| | | | |
|---|---|---|---|
| 5,270,920 A | 12/1993 | Pearse et al. | |
| 6,044,355 A | 3/2000 | Crockett et al. | |
| 6,353,447 B1 * | 3/2002 | Truluck et al. | 715/733 |
| 6,603,854 B1 | 8/2003 | Judkins et al. | |
| 6,707,904 B1 | 3/2004 | Judkins et al. | |
| 6,763,104 B1 | 7/2004 | Judkins et al. | |
| 7,068,774 B1 | 6/2006 | Judkins et al. | |
| 7,103,562 B2 * | 9/2006 | Kosiba et al. | 705/7.38 |
| 8,046,254 B2 * | 10/2011 | Kosiba et al. | 705/7.38 |

(Continued)

FOREIGN PATENT DOCUMENTS

KR 10-2001-0054570 A 7/2001

(Continued)

OTHER PUBLICATIONS

Clapp, Nancy.; "Performance-Centered Training—A Means to An End, Not An End in Itself". Mar. 1998. Telemarketing & Call Center Solutions. vol. 16, No. 9.*

(Continued)

*Primary Examiner* — Peter Choi
(74) *Attorney, Agent, or Firm* — Maschoff Gilmore & Israelsen

(57) ABSTRACT

Several of the embodiments disclosed herein relate to accessing and tracking real-time data concerning company representative performance, proficiency, training, scheduling, current work flow, and estimated work flow. Moreover, many of the improvements in contact handling systems disclosed herein automatically provide training, work, and incentives to company representatives to improve performance, proficiency, efficiency, effectiveness, automate scheduling, and automated work flow. More specifically, this application discloses a method for delivering training to company representatives. Also disclosed is an automated customer service and training management system. As a result of the teachings disclosed herein, customer satisfaction, employee satisfaction, and revenue may be improved in the contact handling industry.

24 Claims, 10 Drawing Sheets

U.S. PATENT DOCUMENTS

| | | |
|---|---|---|
| 2002/0188607 A1* | 12/2002 | Kogut-O'Connell et al. .. 707/10 |
| 2003/0046615 A1 | 3/2003 | Stone |
| 2003/0086555 A1* | 5/2003 | McIlwaine et al. ...... 379/265.02 |
| 2004/0033475 A1* | 2/2004 | Mizuma et al. ............... 434/219 |
| 2005/0060217 A1 | 3/2005 | Douglas et al. |
| 2005/0123892 A1* | 6/2005 | Cornelius et al. ............. 434/323 |
| 2006/0088806 A1* | 4/2006 | Quinn ........................... 434/236 |
| 2006/0274758 A1 | 12/2006 | Busko et al. |
| 2007/0050238 A1 | 3/2007 | Carr et al. |
| 2007/0127689 A1 | 6/2007 | McIlwaine et al. |
| 2009/0089136 A1 | 4/2009 | Minert et al. |
| 2009/0089138 A1 | 4/2009 | Minert et al. |
| 2009/0089153 A1 | 4/2009 | Minert et al. |

FOREIGN PATENT DOCUMENTS

| | | |
|---|---|---|
| KR | 10-0445942 B1 | 8/2004 |

OTHER PUBLICATIONS

Robinson, George.; Morley, Clive.; "Call Centre Management: Responsibilities and Performance". 2006. International Journal of Service Industry Management. vol. 17, No. 3. pp. 284-300.*

Schelmetic, Tracey E.; "A Dashboard! My Call Center Kingdom for a Dashboard!". Apr. 2006. Customer Inter@ction Solutions. vol. 24, No. 10. p. 64.*

Minert et al., U.S. Appl. No. 13/302,989 filed Nov. 22, 2011.

* cited by examiner

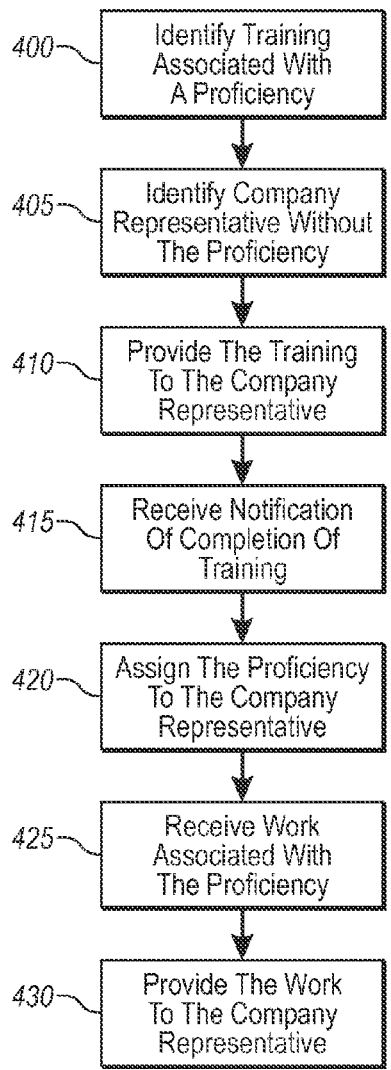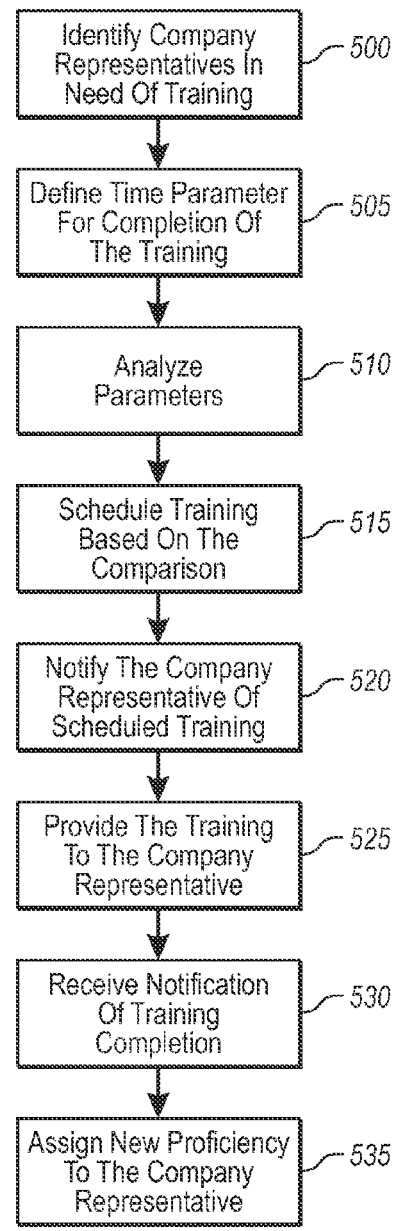
Fig. 4
Fig. 5

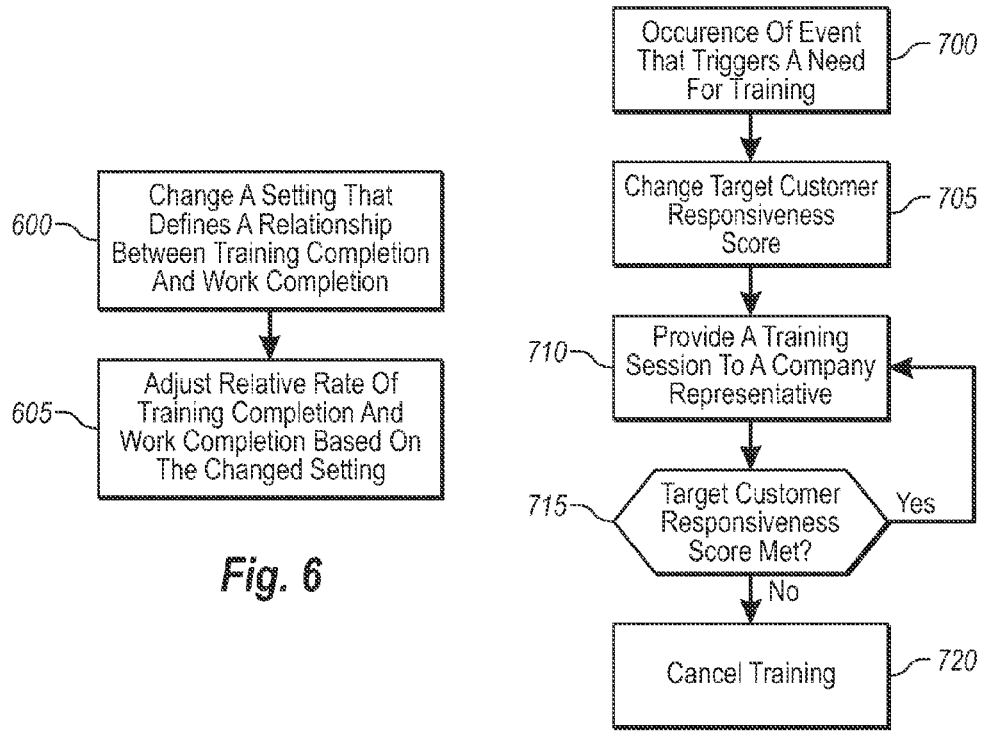
*Fig. 6*
*Fig. 7*
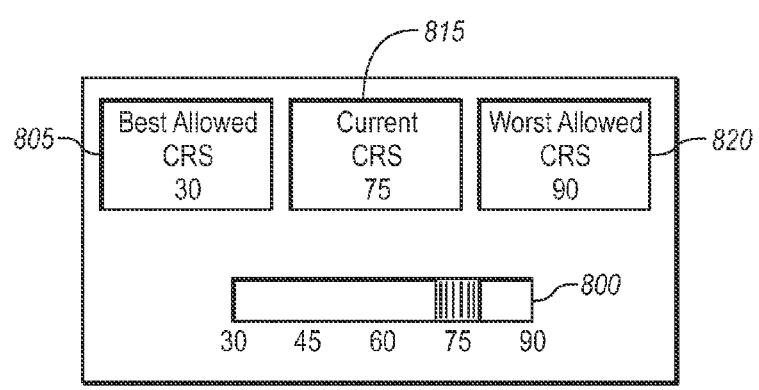
*Fig. 8*

|        | CR1 | CR2 | CR3 | CR4 | CR5 |
|--------|-----|-----|-----|-----|-----|
| Set 1  | T1  | T2  | T3  | T4  | T5  |
| Set 2  | T2  | T3  | T4  | T5  | T1  |
| Set 3  | T3  | T4  | T5  | T1  | T2  |
| Set 4  | T4  | T5  | T1  | T2  | T3  |
| Set 5  | T5  | T1  | T2  | T3  | T4  |

|        | CR1 | CR2 | CR3 | CR4 |
|--------|-----|-----|-----|-----|
| Set 1  | T1  | T2  | T2  | T3  |
| Set 2  | T2  | T1  | T1  | T2  |
| Set 3  | T3  | T3  | T3  | T1  |

Supervisor Graphical Interface 2

| Productivity Score 91% / 98% (Team/Peers) 1400 | Quality Score 91% / 98% (Team/Peers) | Training Score 91% / 98% (Team/Peers) 1415 |
| --- | --- | --- |
| Adherence Score 91% / 98% (Team/Peers) 1405 | Week-to-date $1,102 1410 | Overall Score 91% / 98% (Team/Peers) 1425 |
| | CRM/Sales Score 91% / 98% (Team/Peers) 1420 | |

*Fig. 14*

RAPID DEPLOYMENT OF TRAINING FOR COMPANY REPRESENTATIVES IN CONTACT HANDLING SYSTEMS

CROSS-REFERENCE TO RELATED APPLICATIONS

This application is a continuation of U.S. patent application Ser. No. 11/869,615, filed Oct. 9, 2007. This application also claims the benefit of U.S. Provisional Patent Application Ser. No. 60/977,002, filed Oct. 2, 2007. The contents of both U.S. patent application Ser. No. 11/869,615 and U.S. Provisional Patent Application Ser. No. 60/977,002 are hereby incorporated by reference herein.

BACKGROUND

Contact handling systems provide contact between people. For example, the people can include employees, supervisors, administrators, and customers. In contact handling systems where company representatives interact with customers, the qualification of a company representative to perform different types of work, such as answering questions regarding various topics, is often limited by the proficiencies of the company representatives. To attain new proficiencies in the form of knowledge and skills, the company representatives must receive training. Moreover, in many instances, there needs to be a qualification, such as a test, following the training so as to insure that the company representative has attained the knowledge and skills associated with the new proficiency.

In conventional contact handling systems, the scheduling of training has not been successfully controlled such that the company representatives receive training as soon as the need for training arises. Moreover, scheduling of training has historically ignored real-time information regarding parameters, such as workload requirements, workforce capacity, proficiencies of company representatives, and up-to-date changes to such parameters. Thus, a company representative may often remain idle, or below peak efficiency, at the expense of customer and coworker satisfaction because the company representative does not have the required proficiency, and because the conventional contact handling systems are not capable of providing the necessary training as soon as the need for the proficiency arose.

Finally, conventional contact handling systems have directed efforts toward performing work, often in the form of servicing incoming customer calls. However, such conventional contact handling systems have not associated training with incentives received upon completion, such that employee morale is improved by the completion of the training. Rather, such training completion has often been seen by employees as an unappreciated requirement of an employer, where the benefits to the employer for completing such training are seldom recognized. Such lack of incentive for training completion often results in poor customer service, high employee stress levels, and frequent employee turnover.

The contact handling market has grown over recent years. However, there remains a need in the industry for increased customer satisfaction, increased employee satisfaction, increased efficiency and effectiveness, and/or reduced costs.

BRIEF SUMMARY OF SEVERAL EXAMPLE EMBODIMENTS

A method for delivering training to company representatives is disclosed. The method includes electronically receiving information identifying a company representative in need of training. The method further includes electronically receiving information defining a time parameter for completion of the training. The method further includes automatically scheduling a training session based on one or more parameters. The parameters can include a work schedule for the company representative, a number of company representatives currently on-shift, scheduled company representative capacity during a time frame, current work requirements, where work requirements is defined by an expected amount or rate of communication media, expected work requirements, the time parameter, and/or a customer responsiveness score. The method further includes automatically providing the training session to the company representative as scheduled.

An automated customer service and training management system is disclosed. The system includes a communication media interface configured to receive communication media, each communication medium being associated with a category. The system further includes a queue device configured to place the communication media on-hold until the communication media are routed to a company representative. The system further includes a communication media routing interface configured to route each communication medium to one of multiple company representatives. The system further includes a processor having access to computer executable instructions that when executed cause the processor to compare parameters. The parameters can include at least a work schedule for a company representative in need of training, scheduled company representative call service capacity, expected amount or rate of communication media, a training time parameter, and/or a customer responsiveness score associated with a maximum time in the queue for each communication medium. The system can further include the computer executable instructions being configured to cause the data processor to automatically schedule the training for the company representative based on a result of the comparison.

These and other aspects of the present invention will become more fully apparent from the following description and appended claims.

BRIEF DESCRIPTION OF THE DRAWINGS

To further clarify various aspects of embodiments of the present invention, a more particular description will be rendered by reference to specific embodiments which are illustrated in the appended drawings. It is appreciated that these drawings depict only examples of embodiments of the invention and are therefore not to be considered limiting of its scope. Embodiments of the invention will be described and explained with additional specificity and detail through the use of the accompanying drawings in which:

FIG. 4 discloses an example of a method for assigning work and training to company representatives;

FIG. 5 discloses an example of a method for providing training to company representatives;

FIG. 6 discloses an example of a method for controlling assignment of training and assignment of work to a company representative;

FIG. 7 discloses an example of a method for controlling training completion and work completion by company representatives;

FIG. 8 discloses an example of a graphical interface enabling a user to control completion of training and work by company representatives;

FIG. 14 illustrates an example of a second supervisor graphical interface providing real-time information to a supervisor comparing a team of company representatives to other company representatives;

DETAILED DESCRIPTION OF SEVERAL EMBODIMENTS

Many of the improvements in contact handling systems which may result from the teachings disclosed herein relate to accessing and tracking real-time data concerning company representative performance, proficiency, training, scheduling, current work flow, and estimated work flow. Moreover, many of the improvements in contact handling systems disclosed herein relate to automatically improving company representative performance proficiency, training, incentives, scheduling, and work flow. Thus, as a result of the teachings disclosed herein, customer satisfaction, employee satisfaction, and revenue may be improved in the contact handling industry. While employment of the teachings herein may produce particular benefits in the contact handling industry, such teachings may produce similar benefits in other industries as well, and therefore, are not limited to the contact handling industry. Moreover, as used herein the term company representative includes call center agents, sales team agents, support employees, employees of a business, or agents hired to represent a business.

I. Examples of Contact Handling Systems

Figure 1:
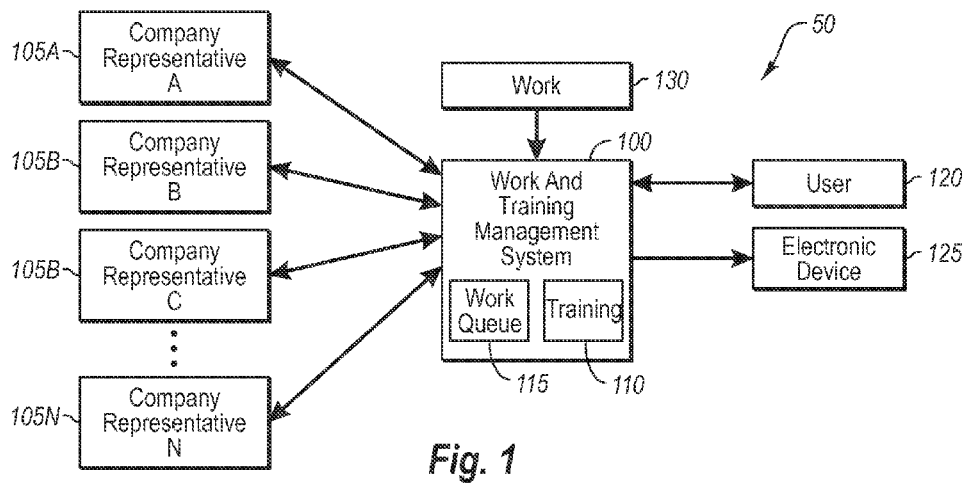
FIG. 1 discloses an example of a contact handling system.

Referring to FIG. 1, a contact handling system 50 is disclosed. In this embodiment, the contact handling system 50 includes a work and training management system 100. The work and training management system receives work 130 from one or more locations. The work and training management system 100 assigns the work 130 to one of several company representatives 105A-N. The work is assigned to the one of several company representatives 105A-N based on company representative parameters that may include proficiency, status, customer satisfaction, schedule, current workload, anticipated workload, and/or any other parameter defining availability and ability of the company representatives 105A-N.

In this example, the work and training management system 100 also includes training sessions 110. The training sessions 110 may be administered in the form of lessons, tests, text, video, audio, interactive training software, and other training session modules which may be electronically provided to the company representatives 105A-N so that the company representatives 105A-N can achieve additional proficiencies upon completion of the training sessions 110. The training sessions 110 may also be provided in a classroom, where the company representatives 105A-N are automatically scheduled for the classroom training and receive an automated electronic notification informing the company representatives 105A-N about the training.

The work and training management system 100 also includes a work queue 115. The work queue 115 retains an amount of work to be performed by the company representatives 105A-N. As the work queue 115 becomes longer with more work in the work queue 115 to be performed, the work and training management system 100 can assign less training sessions 110 to the company representatives 105A-N and assign more work to the company representatives 105A-N. However, the training sessions 110 and/or work in the work queue 115 may also be assigned a priority and the work and training management system 100 can analyze the priority of the work and training to modify the assignment of work from the work queue 115 and training sessions 110 to the company representatives 105A-N.

The work and training management system 100 can receive input from a user 120. The input from the user 120 can specify a priority for work and training. For example, the input from the user 120 can be in the form of an electronic input that specifies training sessions 110 need to be completed by one or more of the company representatives 105A-N. The input from the user 120 can specify company representatives 105A-N to receive the training sessions 110. The user 120 input can also specify a time parameter for completion of the training sessions 110.

The work and training management system 100 can provide notification to the company representatives 105A-N assigned the training sessions 110. The notification can also include a description of the training session 110 to be completed and a time parameter for completion of the training session 110.

A result of the training sessions completed by the company representatives 105A-N can be output to an electronic device 125. For example, the electronic device 125 can be a display, printer, handheld device, memory, modem, router, data processor, video card, circuitry, and/or other electronic device. The result can include an electronic signal that causes information describing the completion of training sessions 110 and newly acquired proficiencies to be visually displayed. Once a new proficiency has been assigned to the company representatives 105A-N, work 130 that correspond to the newly acquired proficiency can be immediately and automatically provided to the company representatives 105A-N from the work queue 115.

Figure 2A:
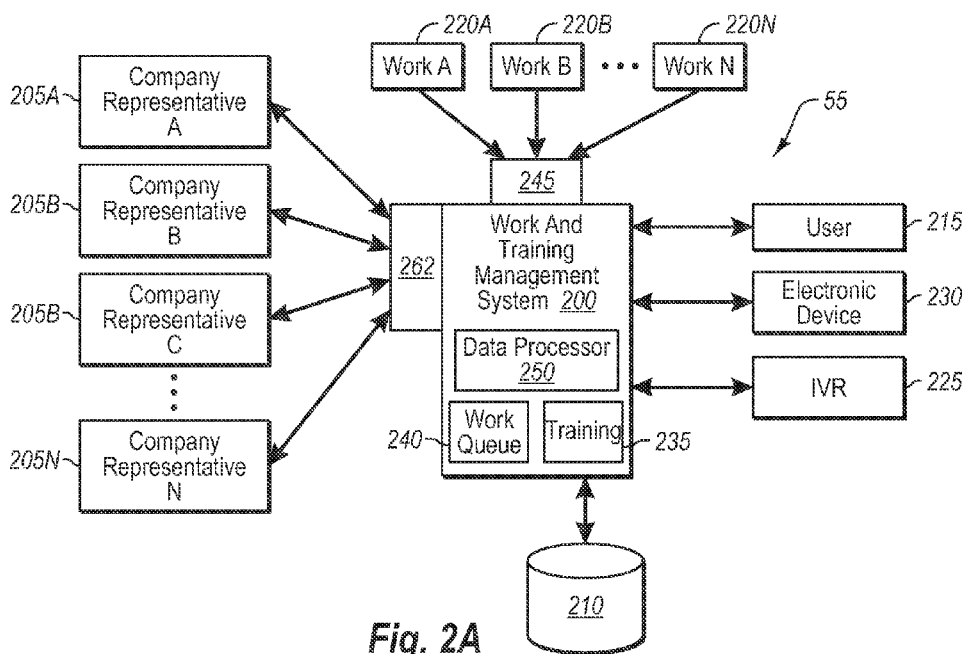
FIG. 2A discloses another example of a contact handling system.
Figure 2B:
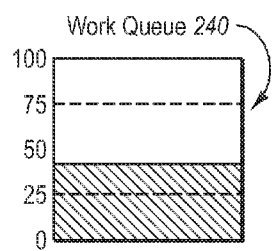
FIG. 2B is a visual representation of a work queue.
Figure 2C:
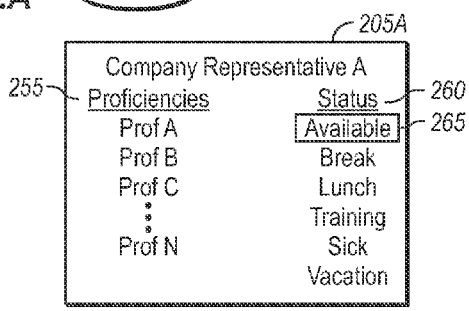
FIG. 2C discloses an example of a data structure listing company representative proficiencies and status.

Referring to FIGS. 2A, 2B, and 2C, aspects of another contact handling system 55 are disclosed. The contact handling system 55 includes a work and training management system 200, a plurality of company representatives 205A-N, a database 210 for storage of data, such as company representative proficiencies, status, and descriptive information. A user 215 provides user input to the work and training management system 200, work 220 in the form of communication media, which as used herein includes customer telephone call, voice recording, email, facsimile, instant messenger text, or chat session. The contact handling system further includes an interactive voice response (IVR) server 225, and an electronic device 230 for storing and/or outputting information for review by the user 215.

Each of the company representatives 205A-N can be accessed by a work station, such as a conventional desktop or laptop computer, special purpose computer, or a handheld device, where the work 220 is serviced by the company representatives 205A-N. The company representatives 205A-N can be located local to the work and training management system 200, for example across a local area network (LAN), or the company representatives can be located remotely from the work and training management system 200, for example across a wide area network (WAN). The WAN can include various private and/or public network links, including the Internet. For example, the company representatives may be at home remotely accessing training 235 and work 220 from a work queue 240. Thus, the company representatives 205A-N may be located in the same building, or anywhere in the world, such that electronic communication between the work and training management system 200 and the company representatives 205A-N is effected via electronic signals, such as telephone, facsimile, email, voice over IP (VoIP), software, electronic display image capture, or by other means for electronic signal communication.

The IVR server 225 can store and provide scripts to the work and training management system 200 to solicit responses from a caller, for example, to determine a requested type of service and what proficiencies are required for answering the questions of the caller. The IVR server 225 can also provide scripts to solicit responses from the caller relating to a requested type of service, for example soliciting feedback in response to a customer survey, or otherwise solicit a rating or evaluation of a company representative.

The work and training management system 200 includes an interface 245 for receiving the work 220, the work 220 being associated with a work category A-N. The work, when in the form of customer calls, may be categorized by responses provided by a caller to an automated menu in response to scripts provided by the IVR, for example. The work categories A-N may each be associated with a different company representative proficiency Prof A-N. Thus, the work categories A, B, and C may be compared to proficiencies of the various company representatives 205A-N so that the work 220 is provided to one of the company representatives 205A-N based on a result of the comparison between the associated work category A-N and the proficiencies of the company representatives 205A-N.

The work and training management system 200 further includes the work queue 240. In the case where the work 220 includes incoming and/or outgoing customer service contacts, the work queue 240 can include, or be associated with, a device and/or software for placing the contacts on-hold until the contacts may be assigned to a company representative 205A-N. The work 220 may be placed in the work queue 240 in a first in first out (FIFO) basis, or the work 220 may be prioritized by an immediacy in which the work 220 needs to be addressed. The work 220 can also be placed in the work queue 240 and be distributed in a basis where the work is routed to a company representative 205A-N in a FIFO according to work category. There may also be multiple work queues 240, each work queue 240 associated with a category of work, such that work 220 associated with a category is received in a work queue 240 and is routed to a company representative along with other work 220 in the same category on a FIFO basis.

Referring to FIGS. 2A and 2B, the work queue 240 may be visually represented as a number of contacts currently on-hold in the work queue 240, an average time for which the contacts remain on-hold in the work queue 240, or any other manner in which the queue level may be represented. The queue level may also be associated with a customer responsiveness score. For example, a customer responsiveness score may specify a maximum average time in queue for work, an average time in queue for work which triggers a need to increase work capacity, a target time in queue for work that varies a need for increased or decreased work capacity, levels of response to a predetermined amount of work in the queue, or a combination thereof.

The customer responsiveness score may be a variable setting in the work and training management system 200. For example, the work and training management system 200 may receive input from the user 215 specifying the customer responsiveness score. In time of urgent training need, the customer responsiveness score may be varied by user input such that additional training sessions 235 are provided to the company representatives 205A-N. The training sessions may provide new product information, new sales techniques, new vocabulary terms, provide new skills, new capabilities, training for internal company policies, or provide any other useful knowledge and skills to provide the company representatives with a new, or higher level of, proficiency.

For example, a natural disaster in one part of the country prompts a corporation to temporarily adopt two policies effective immediately. A first policy is implemented by assignment of a first training to company representatives responding to customer calls within the affected area. The first training being related to a company representative administered discount for emergency related supplies. In this example, a second training can be assigned to all company representatives to increase an emphasis on emergency preparedness with a list of suggested sales items. In this manner the company representatives in the effected area are immediately and automatically provided with information needed to perform work related to the current event. Thus, training can also be assigned to company representatives based on geographic location. Upon sufficient training, the customer responsiveness score may be again varied such that additional work, such as response to customer contacts, may be provided to the company representatives 205A-N to thereby reduce the queue level.

For example, referring still to FIGS. 2A and 2B, in time of urgent training need, an input from the user 215, such as an input from a supervisor, can specify a higher customer responsiveness score thereby resulting in a higher queue level, such as 75 in the example of FIG. 2B. However, in times of reduced training need, the user 215 may specify a lower customer responsiveness score, thereby resulting in a lower queue level, such as 25 or zero in the example of FIG. 2B, resulting in quicker response to incoming work. The need for training may vary as training is completed, new proficiencies are identified, work related to certain proficiencies increase or decrease, new companies are represented, new products are released, real world events, or any other event that may increase or decrease the need for training. Use of the queue level numbers 0-100 should be considered illustrative only and does not necessarily refer to a specific amount of work in the queue nor a specific wait time. Rather, use of the queue level numbers 0-100 may be considered one of many ranges of queue level gradation which may be selectable by the user 215.

The number of user selectable customer responsiveness scores may be limited however, for example by software, employment position, password, or by other means. For example, referring still to FIGS. 2A and 2B, the user 215 may be limited to selecting a customer responsiveness score between 25 and 75. In some instances to select a customer responsiveness score beyond this example of a limited selectable range, the user 215 may be required to have authorization. For example, it may be required to first verify that the user 215 is logged on with privileges to modify the customer responsiveness score, or is capable of entering a password to access a broader range of user selectable customer responsiveness scores resulting in increased and/or decreased delivery of work 240 and training 235.

The work and training management system 200 further includes a data processing device 250 having access to computer executable instructions that cause the data processing device to control assignment of training and work to the company representatives as well as other functions disclosed herein. Such computer executable instructions can be in the form of software. The work and training management system 200 can further include, or be coupled to, the database 210. The database 210 includes data structures stored thereon which are accessible by the work and training management system 200. For example, the data structures stored on the database 210 can include electronic, magnetic, or optically stored information concerning the company representatives 205A-N, concerning work schedules of each company representative 205A-N, concerning scheduled company representative work capacity, concerning expected work requirements, concerning a training time parameter, and/or concerning a customer responsiveness score.

For example, referring to FIGS. 2A and 2C, such information describing company representatives can include lists of proficiencies 255 associated with each company representative. The information describing company representatives can also include a status 260 of each company representative. The status 260 may include a current active status 265 specifying the current status of the particular company representative 205A. For example, the active status 265 may indicate that the particular company representative 205A is available for work or training, on break, at lunch, completing training, sick, on vacation, or not scheduled, and therefore, unavailable. The data processing device 250 can have access to the information stored on the database 210 and can analyze the various information stored on the database 210 to schedule training sessions 235 for the company representatives 205A-N. The information stored on the database 210 is also updated by the data processing device 250 in real-time as soon as changes in real-life occur.

The data processor 250 can also have access to information stored on the database 210 regarding compensation and incentives. The compensation and incentives can be associated with completion of training sessions 235. For example, the data processor 250 can receive information from the user 215 describing a training success criteria. The data processor 250 can also receive information from the user 215 assigning training sessions to one or more of the company representatives 205A-N. The data processor 250 can provide the training sessions, or cause the training sessions to be provided, to the one or more company representatives 205A-N and receive a result of the training from the company representatives 205B. The result can be a time and day of completion of the training session 235 and/or a result from a test associated with the training session 235. The data processing device 250 can compare the result of the training session 235 to training session result criteria to determine whether an incentive should be provided to the company representative 205A-N. Thus, the incentive can be selectively assigned to the company representative 205A-N by the data processing device 250 as soon as the company representative 205A-N successfully completes the training session 235 according to the training success criteria.

Several of the various acts performed by the data processor 250 may also be performed by, or at the direction of, the user 215. For example, the user 215 may be presented with the result of the completed training session 235 and make the comparison of the result of the completed training session 235 to the training success criteria to determine the incentive for the company representative 205A-N. Moreover, any actions taken by the data processor 250 may require approval by the user 215 before implementation. For example, the incentive determined by the data processor 250 may require approval by the user 215. However, in many embodiments such incentive may be automatically implemented by the data processor 250 such that the company representative 205A-N receives immediate confirmation of the incentive and immediately receives the incentive.

In the example of a call contact handling system, the work and training management system 200, can include an interface 262 for assigning the calls to the company representatives. The interface 262 can include an communication media switching device that provides a manner in which contacts may be routed to any of the company representatives 205A-N.

Embodiments illustrated herein can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable media. Thus, any such connection is properly termed a computer-readable media. Combinations of the above should also be included within the scope of computer-readable media. Computer-executable instructions comprise, for example, instructions and data which cause a general purpose computer, special purpose computer, or special purpose processing device to perform a certain function or group of functions.

Figure 3:
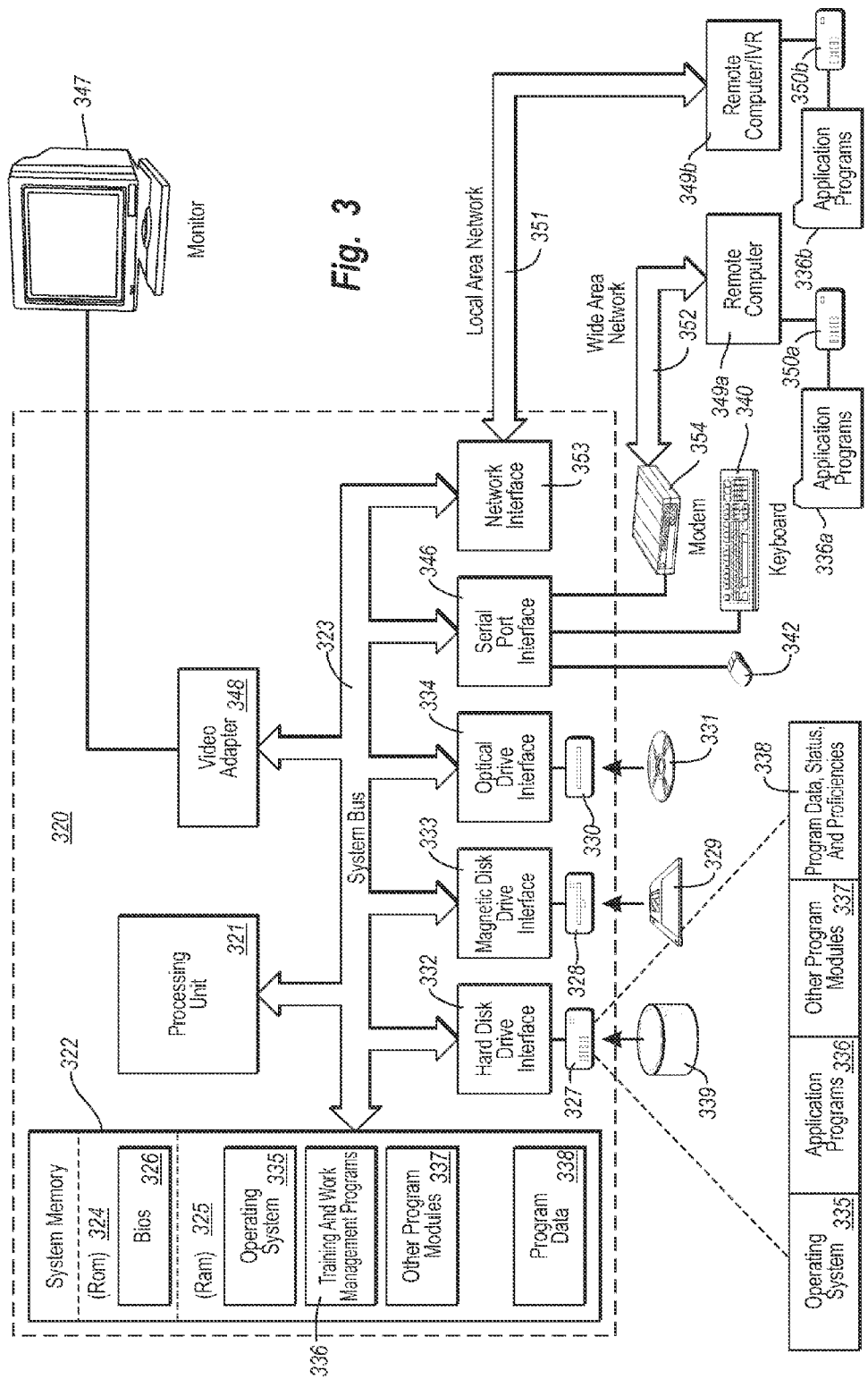
FIG. 3 discloses an example of a suitable computing environment in which several embodiments may be implemented.

FIG. 3 and the following discussion are intended to provide a brief, general description of a suitable computing environment in which several embodiments may be implemented. For example FIG. 3 may illustrate an example of various components of a work and training management system and/or various components of a company representative work station. Although not required, several embodiments will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps disclosed herein.

Those skilled in the art will appreciate that the embodiments illustrated herein may be practiced in network computing environments with many types of computer system configurations, including personal computers, hand-held devices, multi-processor systems, microprocessor-based or programmable consumer electronics, network PCs, minicomputers, mainframe computers, and the like. Several embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an example of a work and training management system for implementing several embodiments is illustrated, which includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324. Such components may also embody a workstation for a company representative.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM, DVD, or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, millipede memory, and the like.

Program code means comprising one or more program modules may be stored on the hard disk 339, magnetic disk 329, optical disk 331, ROM 324 or RAM 325, including an operating system 335, one or more training and work management programs 336, other program modules 337, and program data 338, such as company representative proficiencies and status. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, workstations of company representatives, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a LAN 351 and a WAN 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 for real-time training, routing of work, and adjustment of incentives.

The methods and graphical interfaces discussed hereinafter may be implemented using the examples of contact handling systems disclosed in FIGS. 1-3. However, such methods are not limited to such systems or components thereof and may be practiced by other systems including more, less, or different components than those shown in FIGS. 1-3.

II. Examples of Additional Contact Handling Processes

A. Real-Time Routing of Work to Company Representatives

In some embodiments, the systems disclosed herein automatically and immediately increase work capacity and work routing capability as soon as the work and training management system records that a company representative has successfully completed a training session. The training session may be completed successfully where the company representative passes a test, if required, certifying that the company representative has attained the proficiency intended to be attained in connection with completion of the training session. As soon as the company representative has been assigned one or more new proficiencies, one or more additional categories of work, such as customer contacts raising particular issues associated with the one or more new proficiencies, may be routed to the company representative thereby increasing work capacity and routing capability.

In addition, several embodiments automatically and immediately increase work capacity and routing capability as soon as the company representative has gained relevant experience in a proficiency. For example, where the company representative satisfactorily performs work associated with a newly acquired proficiency for a predefined number of hours, or performs work a predetermined number of repetitions (e.g. addresses a predetermined number of contacts associated with the proficiency) the company representative may be assigned an elevated level of proficiency and be immediately and automatically available to receive work associated with the elevated proficiency level. Moreover, where the company representative does not perform work related to a proficiency, the company representative may be required to recertify that the company representative has retained the proficiency or lose the elevated level of proficiency, or the proficiency all together. There may be several levels of proficiency. For example, there can be between two and ten levels of proficiency.

For example, referring to FIG. 4, a method for assigning work and training to company representatives is disclosed. In this example, the work can be assigned to the company representatives in real-time as soon as the company representatives complete training, or as soon as the company representative and work is available following completion of the training.

The method includes identifying training to be provided to company representatives (400). The need for training may be dictated by the type and volume of work that needs to be completed. The volume and type of work may be altered by a real world event, such as a real-life disaster, new products, enhanced products, sudden changes to products, supply or pricing change, change in agreement terms, a new client to be serviced, new customers, new problems encountered by customers, or any other event that may provide a needed proficiency for the company representatives. For example, where a group of company representatives with a first proficiency experience an increased workload resulting in a longer work queue than a second group of company representatives with a second proficiency, it may be desirable to train some of the second group of company representatives so that some of the work associated with the first proficiency may be assigned to such members of the second group of company representatives. In this way, additional work may be performed by the second group of company representatives, thereby eliminating the need to hire additional company representatives for the first group of company representatives when members of the second group of company representatives are easily meeting the associated workload, or even remain idle at times.

The method includes identifying a company representative lacking the proficiency associated with the training (405). The company representative may be identified by a user, such as a supervisor, or the company representative may be identified automatically by software. The company representative without the proficiency may be identified by manually or automatically searching a database containing information listing proficiencies assigned to one or more company representatives. The company representative can be ultimately identified by receiving an electronic input identifying the company representative. The electronic input may be received from a user input device, or from circuitry. The company representative may be identified along with other company representatives as a team, or the company representative may be randomly selected as a result of the identification of a certain number, or percentage, of company representatives identified for training.

The company representative may be identified as in need of maintenance training. The maintenance training may recertify that a company representative retains a proficiency. Identification of the company representative in need of maintenance training may be accomplished by tracking the types and frequencies of proficiencies used. For example, where a company representative has not received work associated with a particular proficiency for some time, the company representative may receive maintenance training to insure that the company representative retains the required proficiencies. Such maintenance training may, some instance, only include a test so as to recertify that the company representative has retained the proficiency. Where the company representative does not complete the maintenance training, or fails a test associated with the maintenance training, the company representative may loose the associated proficiency, and/or be assigned a lower level of proficiency and no longer be assigned work associated with the proficiency or higher level of proficiency.

The method further includes providing a training session associated with the identified training to the identified company representatives (410). The training session can be provided, for example, electronically via a network. The training session can be provided to the identified company representative in between assignment of work to the company representative. Alternatively, the training session can be scheduled for the company representative in real-time so that the company representative knows when the company representative will need to complete the training session and what training session they will need to complete. For example, the training session can be automatically scheduled for the company representative as soon as the training is assigned to the company representative. In one embodiment, the company representative can access the training session from a computer coupled to the Internet as soon as the training session is scheduled.

The training session can include, or be associated with, a test. The test can be used to certify that the company representative has achieved the intended proficiency following the training session. Where the company representative does not achieve a high enough score on the test, the company representative may be required to retake the training session and retake the test prior to being assigned the associated proficiency. Likewise, the company representative will not be assigned any work associated with the proficiency until the company representative successfully completes the training and test.

The method can further include receiving notification when the training session has been completed by the company representative (415). The notification can be received electronically via email, or an electrical notification that indicates via software that the training session has been completed. The notification can be received by a work and training management system from a workstation, or other computer, where the company representative completes the training. The notification can include a description of the date and time on which the training session was completed by the company representative. Where the training session includes, or is associated with, a test, the notification can further include a result of the test. The result can include a description that the test was completed, was failed, was passed, or may provide a score related to the level of success that the company representative achieved in the test.

Upon satisfactory completion of the training session, the associated proficiency is assigned to the company representative (420). The proficiency can be assigned to the company representative by updating a data structure listing proficiencies associated with the company representative. The associated proficiency may be electronically assigned in real-time by software such that the company representative is automatically assigned the proficiency as soon as the company representative completes the training session.

The method further includes receiving work associated with the same proficiency associated with the completed training session (425). The work can be any type of work to be completed by the company representatives. In an embodiment associated with a call center, the work can be in the form of calls to be serviced, such as answering incoming calls or performing outgoing calls. However, while the teachings disclosed herein find particular advantages in such call center applications, where reduced customer wait time is important, and the need for automated training may be of particular interest, the work performed is not limited to such applications and may find similar or additional potentially unexpected advantages in other applications as well.

The work received may also be of a particular category of work where the category of work is associated with a set of proficiencies. In such instances, the work can be organized based on the associated category, matched with company representatives assigned the same proficiencies that are associated with the category of work, and immediately routed to the company representative having the proficiencies associated with the category of work. Assignment of the work to the company representative can occur in real-time such that the company representative receives work associated with a newly acquired proficiency as soon as the company representatives are assigned the new proficiency.

In some embodiments, the company representatives may be organized into teams. For example, members of a team of company representatives may share several proficiencies, and when a need for training is identified, the training may be assigned to each member of the team of company representatives. Thus, training can be electronically provided to each member of the team of company representatives in real-time as the need for training is identified. For example, where team A has proficiencies associated with a category of work relating to product A, where an improvement to product A occurs, each member of team A can be assigned training to provide team A with the knowledge and skills to perform work associated with product A.

As soon as each member completes the training session, either individually or as a team, the proficiency associated with the training can be assigned to each member of the team of company representatives. Work can then be provided to the team of company representatives as soon as each member of the team of company representatives is assigned the proficiency (430).

Information describing each of the acts disclosed herein can be output to an electronic device. The information can be automatically output in real-time as soon as the acts disclosed herein are performed. For example, information describing company representatives completing training, company representatives performing work, assignment of training, assignment of work, work in the queue, a customer responsiveness score, proficiencies, newly acquired proficiencies, status of company representatives, comparisons between company representatives and teams of company representatives, and information describing whether the customer responsiveness score is met can be output to an electronic device. One example of an electronic device is a display. Thus, such information can be output to a display as part of a graphical interface where a supervisor, company representative, or other user, can view such information.

Moreover, after review of such information, the user can provide real-time control over any of the functions disclosed herein regarding the identification and assignment of training to company representatives, and the assignment of work to the company representatives.

B. Real-Time Routing of Training to Company Representatives

In addition to updating of routing capability, embodiments disclosed herein also relate to methods for rapid and automated training of company representatives. When a supervisor identifies a need for training that is currently available, the systems described above can allow the supervisor to identify company representatives or teams of company representatives to be provided the training.

As an additional feature, the systems can be configured such that those assigning the training to the company representatives set up a scheme for training assignment. For example, the user can relate the training to proficiencies already assigned to the company representatives. The work and training management system uses the identified relationship between an existing proficiency and a new proficiency to act as a rule by which the training is assigned to other company representatives via software.

Referring to FIG. 5, a method for providing training to company representatives is disclosed. The method includes identifying one or more company representatives in need of training (500). The identification may be received via an electronic input from a user, or from circuitry, such as a processor, executing computer executable instructions that cause the circuitry to identify company representatives in need of training.

The method further includes defining a time parameter for completion of the training (505). The time parameter may be defined by a user, or by software. The time parameter can include a target date for completion of a training session, a target number of days for completion of the training session, a target number of training sessions to be delivered during a time frame (e.g. a number per day), or may indicate that no time requirement is set at this time. For example, the time parameter can define a time parameter for a single company representative, a time parameter for a team of company representatives, a number of training session completions to be completed in a time period, or a time parameter for a group of selected company representatives.

Multiple time parameters may also be defined. Thus, a first time parameter may define a time by which a first training session is to be completed, and a second time parameter may define a second time by which a second training session is to be completed. Moreover, the first time parameter may require a first team of company representatives to complete a training session during a first time period. The second time parameter may require a second team of company representatives to complete the same training session during a second time period that is different than the first time period. The second time period may overlap the first time period (i.e. at least partially in parallel) or the second time period may be entirely before or after the first time period (i.e. in series). The time parameter may also be automatically determined based on a need for providing the additional proficiencies to the company representatives.

The method further includes analyzing various parameters to schedule the training session for the company representative (510). For example, work schedules, a number of company representatives currently on-shift, scheduled company representative capacity during a time frame, current work requirements, expected work requirements, the one or more time parameters, a relative priority parameter between training completion and work completion, the earliest shift scheduled for each company representative, a shift length of each scheduled company representative, a shift length of each scheduled company representative versus seating capacity in the instance that a shift can be extended, and/or a customer responsiveness score may be compared.

For example, work capacity and current or expected work requirements can be analyzed to identify time where work capacity outweighs current or expected work requirements and training may be scheduled during such times. The work requirements can include a number of customer contacts to be serviced. The customer contacts to be serviced can include incoming calls to a call center and/or outgoing calls from the call center.

The training session is then scheduled based on a result of the analysis of the parameters (515). For example, as a result of the analysis of the various parameters, company representative schedules may also be modified to accommodate the training. For example, work schedules may be changed, lengthened, shortened, added, removed, or otherwise modified during the scheduling of the training.

Each company representative scheduled for training can be notified regarding the scheduled training (520). The notification can include sending an electronic notification by various media to the company representative. The notification can include information describing the training and the time parameter for completing the training. Examples of notification media include an automated email, an electronic appointment for insertion in an electronic calendar program, an automated telephone call, an automated text message, and/or an automated facsimile. The notification can be automatically generated by software as soon as the training session is scheduled and the time parameter is received. The notification can notify the company representative of the scheduled training session and time parameter when the company representative is on-shift or off-shift.

The method further includes providing the training session to the company representative (525). The training session can be provided to the company representative when the company representative is on-shift or off-shift. For example, the company representative may be intermittently provided the training session while the company representative is at work, and may occur intermittently between completion of work by the company representative. The training session can also be provided to the company representative via a remote electronic device. For example, the company representative can be notified of the need to complete the training session during a particular time period, and the company representative can access the training session from home, or other remote location, via the Internet, or the training session may be communicated, or otherwise made accessible, to the company representative in another manner.

The method can further include receiving an electronic signal indicating completion of the training session by the company representative (530). The completion notification can include information describing the time and date of completion of the training session and/or a result, such as a score, achieved in a test included in, or associated with, the training session. Upon completion of the training session, the company representative is assigned the new proficiency (535). For example, information stored in a database can be updated to include the newly acquired proficiency.

Completion of training sessions can affect scheduling, shift extensions, and at-home notifications, as well as instantly allowing the change in work capacity as discussed above with regards to FIG. 4. Real-time reporting can include training completion, success of completion such as scores, and average scores in tests certifying the results of the training. Real-time reporting can be accomplished by displaying the information in electronic or paper format, by providing electronic notification, or by other means.

C. Real-Time Prioritization Between Work and Training

Several embodiments disclosed herein further include a selectable work response setting. In such embodiments, a supervisor, for example, can vary the work response setting such that a relative priority between work completion and training completion may be varied. For example, the systems described above can include a prioritization control module. The prioritization control module can include a first setting and a second setting. The first setting can be labeled in such a manner as to show preference for work completion, and the second value can represent preference for training completion (with the result of least-desirable work completion).

In one embodiment, the supervisor may be allowed to set the relative level of work completion and training completion at gradations of 10-100 steps, where the step 100 is the highest work completion preference and 10 is the highest training completion preference in this example. Based on the setting chosen, the system computes the customer responsiveness score for the chosen setting by scaling the two end values against the prioritization control setting gradation. For example in a range of 30-90 seconds allowable customer responsiveness score variation, set 10% from 90, the customer responsiveness score for average queue time is 90−((90−30)×0.10), or 84 seconds. An administrator can also enable a limited range of discretionary adjustment allowed to the supervisor.

During normal system operation and workload levels, the system can use an administrator-defined customer responsiveness score. The system delivers training to company representatives while the customer responsiveness score is exceeded, and avoids training while the customer responsiveness score is not met. Training sessions can be cancelled if the system approaches (e.g. within 5%, 10%, or 20% or higher) the least-desirable priority control value in order not to exceed the least-desirable priority control value. During unexpected traffic patterns, however, or times of urgent training needs, the supervisor may override the default prioritization control, within limits set by the administrator. The prioritization control override may be determined by the judgment of the supervisor, or according to an internal business scheme.

For example, referring to FIG. 6 a method for controlling assignment of training and assignment of work to one or more company representatives is disclosed. The method includes changing a priority setting that defines a relationship between a training parameter and a workflow parameter (600). The method further includes adjusting the relative rate of training completion and work completion based on the change in the setting (605).

FIG. 7 discloses another method for controlling training completion and work completion by company representatives. An event occurs that triggers the need for training (700). A target customer responsiveness score is changed as a result of this event (705). For example, an electronic input can be received from a user that specifies a new target customer responsiveness score. The change in target customer responsiveness score affects a relative priority between work completion and training completion. The target customer responsiveness score may relate to an allowable level of work in a queue. If the allowed level of work stored in the queue is allowed to increase by increasing the customer responsiveness score, the amount of time spent by company representatives completing training may be correspondingly increased. The target customer responsiveness score can relate to a service level agreement between a work provider and a company contracting with the work provider. The service level agreement may include an average time in queue, and a required success rate in maintaining the average time in queue for work. For example, the success rate may specify that an average time in queue of one and a half minutes must be achieved 80% of the time. The target customer responsiveness score may be allowed to cause a service level to not be met, where urgent needs of training are required. However, the level to which the target customer responsiveness score is allowed to be changed may be limited by an administrator as discussed below.

The method further includes delivering a training session to company representative(s) (710). The amount of training delivered to the company representatives is increased or decreased until the customer responsiveness score is met (715). The amount of training may refer to types of training, length of training, number of training sessions delivered, timing of training, or other factors that relates to an effect the training has on the company representatives capacity for work completion. Thus, where the customer responsiveness score is increased, thereby allowing for additional training, the additional training may be automatically electronically provided in real-time to the company representative(s) (710) until the average time of work in the work queue increases to the specified customer responsiveness score (715). Once sufficient training has been completed, the customer responsiveness score may be automatically or manually reduced such that the priority of work completion is increased, and the amount of work in the work queue is subsequently reduced.

As discussed above, the customer responsiveness score may refer to an average time that work spends in the queue before the work is provided to a company representative. According to one example, an average time in the queue may be varied between immediate response and three minutes before response, for example. According to another example, an average time in the queue may be varied between thirty seconds and three minutes. According to another example, an average time in the queue may be varied between thirty seconds and one and a half minutes.

1. Limited Selectable Customer Responsiveness Scores

The range of selectable customer responsiveness scores may be limited to a maximum selectable setting and a minimum selectable setting. Such settings can be team specific such that a first customer responsiveness score setting associated with a first team of company representatives can be different than a second customer responsiveness score setting associated with a second team of company representatives. In some instances there maybe a greater need to complete training for a first team of company representatives and a greater need to complete work for a second team of company representatives.

With respect to such settings, the training session may be provided only when the customer responsiveness score is met. Where the customer responsiveness score is not met (715), training can be canceled (720). Moreover, where the customer responsiveness score is not met (715), training sessions already begun by company representatives may be canceled at that time (720) and completed at a later date.

2. An Example of a Graphical User Interface for Setting a Customer Responsiveness Score Referring to FIG. 8, a graphical interface is disclosed that enables a user to control completion of training and work by company representatives. The graphical interface shown in FIG. 8 may represent an example of a screen presentation displayed as a window in conjunction with a Microsoft Windows software package. The graphical interface shown in FIG. 8 may be presented along with other graphical interface windows discussed herein.

The graphical interface includes a first graphical input element 800 configured to provide a visual representation of a target customer responsiveness score, the target customer responsiveness score being a selectable level of relative priority between work completion and training completion by the company representatives. In this example, the first graphical input element 800 is embodied by a graduated bar that extends between a minimum selectable priority level of 30 on the left of the first graphical input element 800 and a maximum selectable priority level of 90 on the right of the first display element 800. As discussed above, the selectable priority level may be limited, or limited based on authority to vary the selectable target customer responsiveness score.

The graphical interface further includes a first display element 805 displaying a most optimal allowed customer responsiveness score. The most optimal allowed customer responsiveness score is an example of a limit on the range of selectable customer responsiveness score which results in the most priority directed toward work completion. The graphical interface further includes a second display element 810 displaying a worst allowed selectable customer responsiveness score. The worst allowed selectable customer responsiveness score results in the most priority directed toward training completion and the least priority directed toward work completion. The graphical interface further includes a third graphical display element 815 that displays current customer responsiveness score. The current customer responsiveness score can vary in real time as the amount of work to be completed varies in real-life. For example, as the average time of work in a queue, or an amount of work in a queue changes the current customer responsiveness score can vary according to the changes that occur in the work queue in real life, and automatically effect that amount of work and training that is provided to the company representatives as soon as the changes occur in real life.

D. Distributed Training for Company Representatives

In the case where multi-part training is not order dependent, an administrator can configure a "scatter upgrade", wherein training sessions are statistically distributed across a group of company representatives. For example, if an immediate need for five independent upgrades is triggered, the work and training management system will select from among the five training sessions, keeping training completion totals equivalent across all five training sessions in some embodiments, allowing for rapid dissemination of a wide but shallow upgrade capacity that deepens with additional training completion over time. In many embodiments, all representatives eventually receive all of the training sessions, but an individual company representative may not be able to predict the order in which the company representative will receive the training sessions.

Each training set can be tracked in a database in a manner similar to single-instance training sessions as discussed above. When each company representative satisfactorily completes the required training, the increase in work capacity by the increased proficiencies can immediately be accounted for in the routing of work as discussed with regard to FIG. 4. Training delivery can include aspects of real-time prioritization control of training delivery versus customer responsiveness discussed above with regards to FIGS. 5-7. Historical reporting to supervisors and company representatives can reflect any new incremental capability each time the report is generated. Thus, real-time reporting can immediately reflect each new increase in company representative capability.

Figure 9:
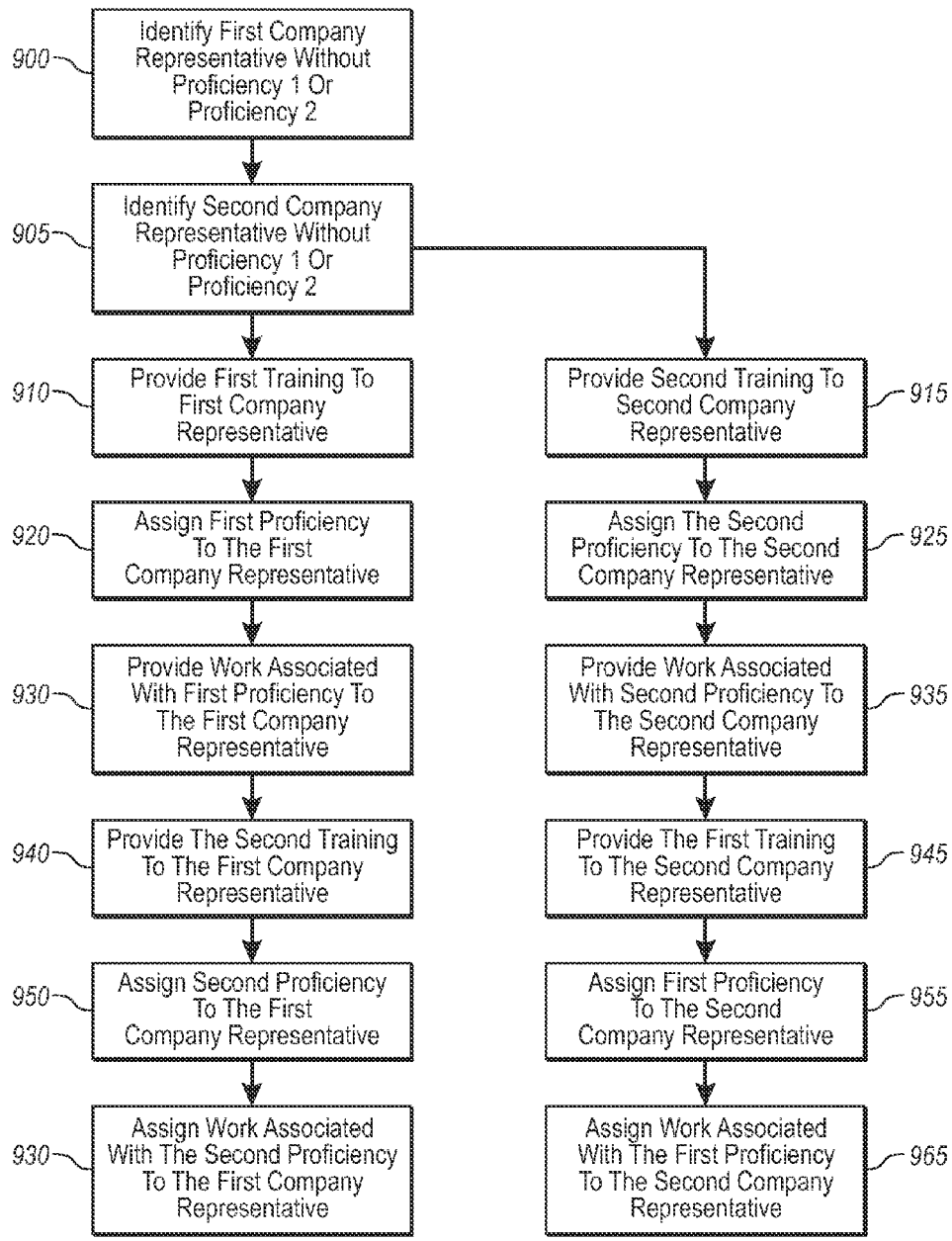
FIG. 9 discloses an example of a method for managing work and training for company representatives.

For example, referring to FIG. 9, a method for managing work and training for company representatives is disclosed. The method includes identifying a first company representative without a first proficiency associated with a first training, and also without a second proficiency associated with a second training (900). The method further includes identifying a second company representative without the same first proficiency and without the same second proficiency (905).

The method includes providing the first training session to the first company representative (910) and providing the second training session to the second company representative (915). After the first training session is completed by the first company representative, the proficiency associated with the first training session is assigned to the first company representative (920). After the second training session is completed by the second company representative the second proficiency is assigned to the second company representative (925). The assignment of proficiencies can be accomplished by storing data in a database associated with the proficiencies assigned to the company representatives.

As soon as the first proficiency is assigned to the first company representative, work associated with the first proficiency can be immediately provided to the first company representative (930). Likewise, as soon as the second proficiency is assigned to the second company representative, work associated with the second proficiency can be immediately provided to the second company representative (935). Thus, at this point, the company has one company representative trained in each of the first and second proficiencies such that the company representatives are, collectively, able to receive work associated with the first and second proficiencies.

After the first training session is completed by the first company representative, the second training session is provided to the first company representative (940). Likewise, after the second company representative has completed the second training session, the first training session is provided to the second company representative (945).

As soon as the second proficiency is assigned to the first company representative (950), work associated with the second proficiency can be immediately provided to the first company representative (960). Likewise, as soon as the first proficiency is assigned to the second company representative (955), work associated with the first proficiency can be provided to the second company representative (965). Thus, at this point, both company representatives have been assigned the first and second proficiencies, and each representative is therefore able to receive work associated with both the first and second proficiencies.

These teachings may be expanded to any number of company representatives and any number of training sessions. For example, referring to FIG. 10, a chart disclosing a method for managing work and training for five company representatives CR1-CR5 is illustrated. An electronic input may be received identifying each of the five company representatives CR1-CR5, or a database can be searched to identify the five company representatives CR1-CR5, who lack the five proficiencies associated with the five training sessions T1-T5. Any number of company representatives or teams of company representatives may be identified along with any number of training sessions, where the numbers of company representatives and training sessions used herein are for illustrative purposes only.

During a first training set, the first company representative CR1 is provided with a first training session T1, the second company representative CR2 is provided with a second training session T2, the third company representative CR3 is provided with a third training session T3, the fourth company representative CR4 is provided with a fourth training session T4, and the fifth company representative CR5 is provided with a fifth training session T5. Therefore, at this point, one of the five company representatives CR1-CR5 is trained in each of the five training sessions T1-T5.

Providing the training sessions to each of the five company representatives CR1-CR5 may be accomplished automatically by computer controlled routing for assignment of the training sessions T1-T5. Moreover, the proficiency associated with each of the training sessions T1-T5 provided to the company representatives CR1-CR5 can be immediately assigned to the respective company representatives such that work associated with each proficiency can be assigned to the corresponding company representative as soon as the training session is completed as discussed above with regard to FIG. 4.

During a second training set, the first company representative CR1 is provided with the second training session T2, the second company representative CR2 is provided with the third training session T3, the third company representative CR3 is provided with the fourth training session T4, the fourth company representative CR4 is provided with the fifth training session T5, and the fifth company representative CR5 is provided with the first training session T1. Therefore, at this point, two of the five company representatives CR1-CR5 are trained in each of the five training sessions T1-T5.

Figures 10, 11, 12:
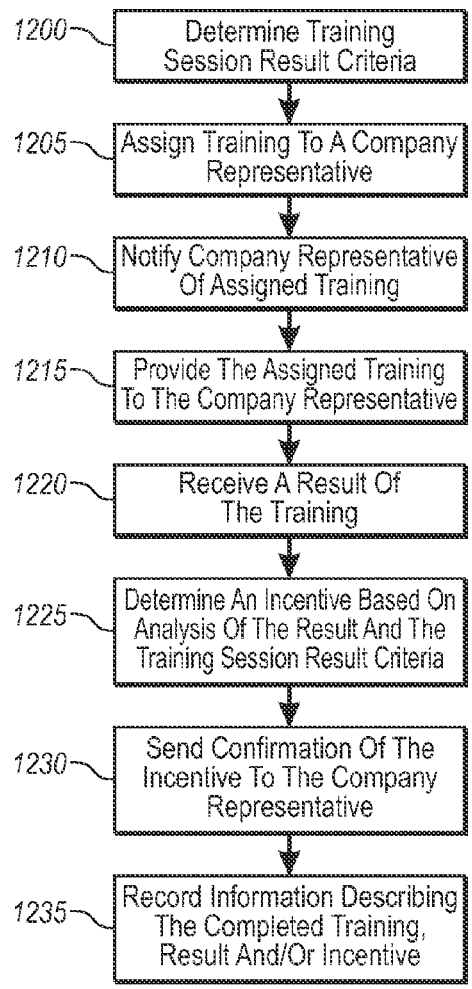
FIG. 10 depicts a chart disclosing an example of a method for managing work and training for company representatives.
FIG. 11 depicts a chart disclosing an example of a method for managing work and training for company representatives.
FIG. 12 discloses a method for determining incentives for a company representative.

Similarly, during a third, fourth, and fifth training set, the training sessions are sequentially provided to each of the company representatives CR1-CR5 as shown in FIG. 10. Thus, after the fifth training set all five of the company representatives CR1-CR5 have been trained in all five of the training sessions T1-T5. However, over the course of each set, the depth of each proficiency is deepened thereby gradually increasing the amount of work associated with each proficiency that can be routed to the company representatives CR1-CR5.

The rotation of training sessions between sets of training is not necessarily sequential. For example, the rotation of training session may be according to a scheme, pattern, random, or on any basis. However, according to another embodiment, training sessions can be assigned a priority level and be provided to company representatives based at least in part on the priority level assigned to each training session. Thus, the depth of each proficiency can be increased at different rates depending on a priority associated with each proficiency and associated training.

For example, referring to FIG. 11, an example of a method for managing work and training for company representatives is illustrated. In this example, there are four company representatives CR1-CR4, three training sessions T1-T3 to be completed, and three training sets during which the training T1-T3 is completed. In this example, a second training session T2 has been assigned a higher priority than a first training session T1, and the first training session T1 has been assigned a higher priority than a third training session T3.

During a first training set, the first company representative CR1 is provided with the first training session T1, the second company representative CR2 is provided with the second training session T2, the third company representative CR3 is provided with the second training session T2, and the fourth company representative CR4 is provided with the third training session T3. Therefore, upon completion of the first training set, two company representatives CR2 and CR3 are assigned the proficiency associated with the second training session T2 assigned the highest priority, one company representative CR1 is assigned the proficiency associated with the first training session T1 assigned the second highest priority, and one company representative CR4 is assigned the proficiency associated with the third training session T3 assigned the lowest priority. As a result, as soon as the newly acquired proficiencies are assigned, twice as much work associated with the second proficiency can be assigned to the company representatives, as compared to the volume of assignable work associated with the first and third proficiencies.

During a second training set, the first company representative CR1 is provided with the second training session T2, the second company representative CR2 is provided with the first training session T1, the third company representative CR3 is provided with the first training session T1, and the fourth company representative CR4 is provided with the second training session T2. Therefore, upon completion of the second training set, all four company representatives CR1-CR4 are assigned the proficiency associated with the second training session, three company representatives are assigned the proficiency associated with the first training session, and one company representative is assigned the proficiency associated with the third training session. As a result, more work associated with the first and second proficiencies can be completed by the company representatives as compared to the volume of assignable work associated with the third proficiency.

During a third training set, the first, second, and third company representatives CR1-CR3 are provided with the third training session T3 and the fourth company representative CR4 is provided with the first training session T1. Therefore, upon completion of the third training set, all four company representatives CR1-CR4 are assigned the proficiency associated with each of the three training sessions T1-T3. However, as illustrated in FIG. 11, where different training sessions are needed, the different training sessions can be selectively provided to different company representatives in a predetermined pattern such that each training session is dispersed across a group of company representatives according to a priority assigned to each training session.

E. Real-Time Training and Incentives for Company Representatives

According to the teachings disclosed herein, incentives may be automatically associated with completion of training and/or testing. For example, incentives may be awarded based on a combination of timeliness and score for training completion. In this instance, the company representative is notified of the need to complete a training session, and that timeliness is important. Thus, where two company representatives are assigned training, each company representative completes a test as the last step of the training. Where a first of the company representatives completes the training in two days, with a score of 100%, that company representative automatically receives a pay increase, effective immediately, of $0.17 per hour. However, a second of the company representatives completes the training in four days, with a score of 100%, and automatically receives a pay raise, effective immediately, of $0.11 per hour. Therefore, the level of incentive can be determined based at least in part on training completion timeliness.

According to another example, scores and/or ratings are received via a customer satisfaction system and taken into consideration to determine an incentive. One format for capturing these customer satisfaction scores is a customer survey, however, any application medium for gathering customer satisfaction levels may also be used. For example, the methods disclosed herein can include an act of providing a customer survey. The methods can further include an act of receiving a result of the customer survey. The result can include an evaluation of a company representative who assisted the customer. The result can be automatically taken into consideration to determine an incentive. The result can also be taken into consideration when assigning a proficiency, or an elevated level of proficiency. The result of a survey can also determine assignment of training. For example, a result of a survey may identify a company representative in need of training. The training can be assigned to the company representative by a supervisor or automatically and immediately as soon as the result of the survey is received. Scores and/or ratings can also be received by supervisors monitoring the work completion by the company representatives. There can be scores from website feedback and customers requesting to speak to a supervisor. The result can also take into consideration attendance, punctuality, dress, conduct, supervisor evaluations, and peer-comparisons between different company representatives.

The results of this performance scoring can result in no change in compensation, a decrease of pay rate until training is complete, an increase or decrease in pay rate based on test scores, and/or issuance of a one-time benefit, for example. Incentives may also be in the form of material awards such as a monetary bonus, gift certificate, apparel, or a consumable. Incentives may also be in the form of non-monetary rewards or privileges, such as shift-bidding priority, extra paid time off, change of job title, eligibility for next-level training, promotion, coaching, mentoring, or temporary parking.

Representatives are automatically informed of incentives. For example, the representatives can be immediately informed of a determined incentive as soon as the representative completes the training via the notification media disclosed above. All automated changes in compensation and other incentives can be based on settings made by administrators and stored in the database for action by the system. Such changes may be part of the tracking related to real-time results of test scheduling, completions, and scores.

For example, referring to FIG. 12, a method for determining incentives for a company representative is disclosed. The method includes determining a training success criteria (1200). The training success criteria can include a required number of correct answers on a test to successfully complete the training. The training success criteria can also specify different levels of success. For example, the training success criteria can specify a first number of correct answers for a first level of success, and a second number of correct answers for a second level of success. The training success criteria can also include a required success in customer completed surveys.

The training success criteria can further include a timeliness criteria. The timeliness criteria can have different levels of required timeliness. For example, the timeliness criteria can be defined by a first maximum permissible amount of time between assignment of the training and completion of the training by the company representative, resulting in a first incentive. The timeliness criteria can further be defined by a second maximum permissible amount of time between assignment of the training and completion of the training by the company representative, corresponding to a second incentive.

The training success criteria can be determined by a user, such as a supervisor, or the training success criteria can be determined by a machine executing software to determine the training success criteria. The training success criteria can be received from an electronic input device, such as a keyboard, mouse, pointer, touch screen, or other electronic input device; or the training success criteria can be received in the form of an electrical signal from circuitry, such as hardware executing software.

The method further includes assigning a training session to a company representative (1205). For example, an electrical input can be received that assigns the training to the company representative.

The method can include notifying the company representative of the assigned training (1210). The method can further include notifying the company representative of the training success criteria, which can include a timeliness requirement for completing the training session. The method can further include notifying the company representative of an incentive that will be determined upon completion of the training session according to the success criteria.

The training session is provided to the company representative (1215). A result of the training is received (1220). The result can include a date and time that the training was completed. Where training session includes a test, the result can further include a score received by the company representative on the test. The result can also indicate whether the timelines requirement was met.

The incentive is determined based on an analysis of the result of the training session and the success criteria (1225). For example, the incentive may be in the form of an increase in compensation, a decrease in compensation, no change in compensation, a monetary bonus, increase in wage, a privilege, shift bidding priority, paid time off, a change in job title, eligibility for additional training, a promotion, coaching, mentoring, parking, a gift certificate, apparel, any type of consumable, or any other incentive.

The result analyzed can also include feedback from a contact. For example, after the company representative has completed training and been assigned a proficiency associated with the training, the company representative can receive work in the form of servicing customer calls associated with the newly assigned proficiency. After the calls are serviced, the customer can complete a survey evaluating the company representative. Thus, a result of this survey can be received and also be considered in determining the incentive.

Information describing the incentive can be communicated to the company representative and/or the user (1230). The user can provide approval of the incentive or the incentive can become effective as soon as the incentive is determined, and the incentive may be determined in real-time as soon as the company representative completes the training according to the training success criteria. Information describing the incentive can also be stored in a database or other computer-readable media (1235).

III. Additional Examples of Graphical User Interfaces

Various user interfaces can be used to communicate between the user, the company representatives, and the software and/or hardware implementing the processes disclosed herein. For example, graphical user interfaces can be used to receive user input from user input devices and to display information for the user to review, and upon such information, decisions may be made. The information displayed can describe any aspect of training, assignment of work, work completion, work queue level, company representative performance, team performance, or any other parameter disclosed herein. Moreover, a graphical user interface can further include one or more input fields for receiving user input.

Figure 13:
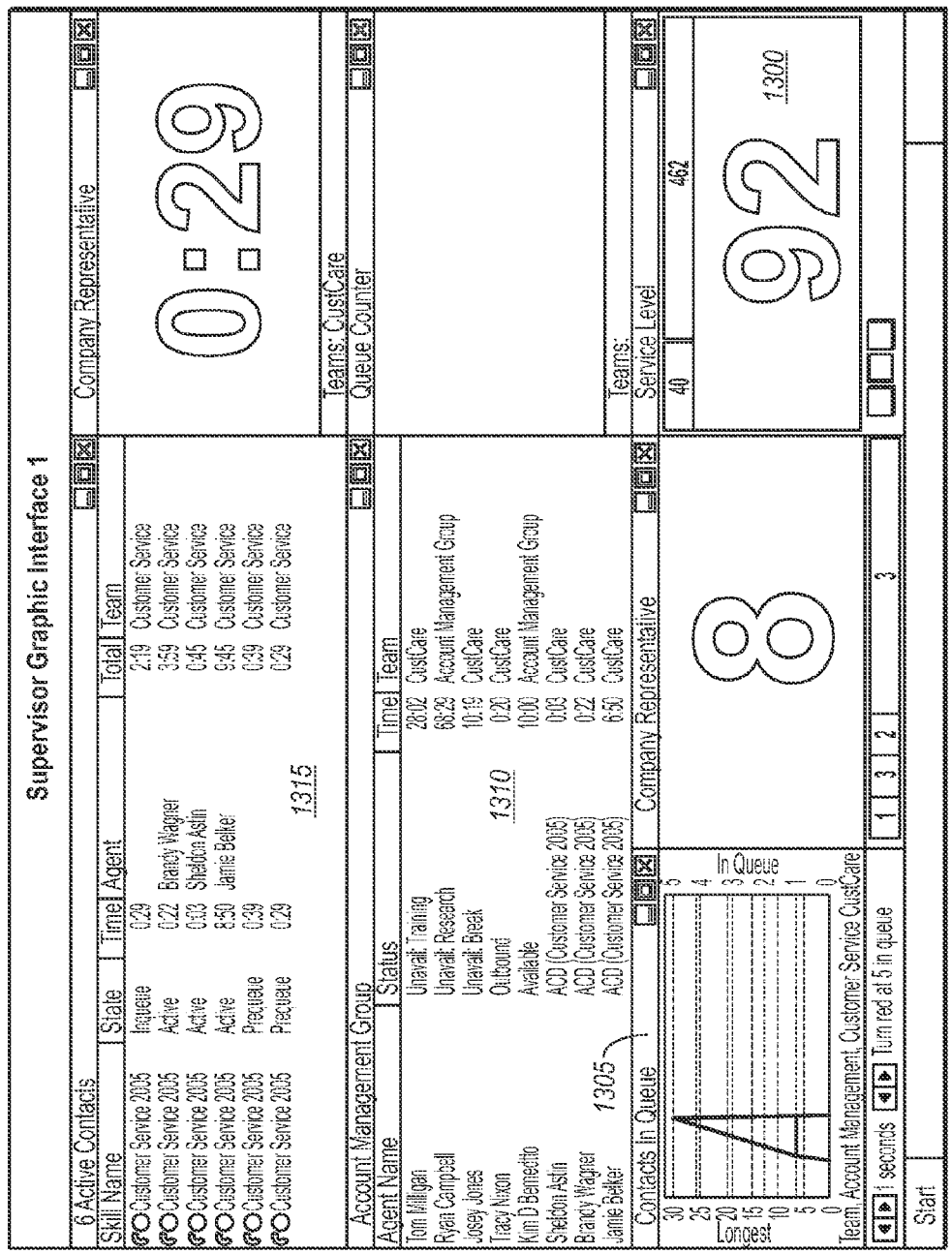
FIG. 13 illustrates an example of a first supervisor graphical interface enabling a supervisor to monitor and control real-time delivery of work and training to company representatives.

For example, FIG. 13 discloses aspects of one example of a first supervisor graphical interface that enables a supervisor to monitor and control real-time delivery of training and work to company representatives. The graphical interface includes a first display element 1300 configured to provide a visual representation of a priority setting being a selectable level of priority between work completion and training completion by the company representatives. For example, in this embodiment the number 92 can refer to a target customer responsiveness score, which can relate to a specified average time in a queue for work.

The graphical user interface includes a second display element 1305 configured to graphically display work stored a queue. For example, the second display element 1305 can list a number of calls on-hold in a queue. The second display element 1305 can also show a historical representation of the number of calls stored in the queue over time. The second display element 1305 can be team selectable such that information describing work stored in a queue for different teams of company representatives can be displayed. Similarly, any of the other graphical display elements may be team or individual company representative selectable.

The graphical user interface further includes a third display element 1310 listing information identifying the company representatives and listing a status of each company representative. For example, the third display element 1310 can list a company representative's name, status, duration of time that the company representative has been at the current status, and team to which the company representatives belong.

The graphical user interface further includes a fourth display element 1315 listing active contacts. The fourth display element 1315 further provides a state for each active contact, for example, whether the active contact is being serviced, is on-hold in the queue, or is in a pre-queue state. In the pre-queue state, the contact may be interacting with an automated interactive menu. The automated interactive menu can use scripts received from the IVR and can provide automated questions to classify the contact with a category of contacts, and/or associate proficiency(s) for assigning the contact to a company representative or a team of company representatives with the associated proficiencies. Certain categories and/or proficiencies can be automatically associated with the contact based on a phone number which the contact called, or information about the contact that is already known. For example, if the number from which the contact calls identifies the contact with known information, that information can be accessed and used to associate the contact with a proficiency for assigning the contact to a company representative.

Referring to FIG. 14, a second supervisor graphical interface is shown. The second supervisor graphical interface includes several display outputs visually displaying real-time information of interest to a supervisor of company representatives. For example, the second supervisor graphical interface includes several display outputs that compare the supervisor's team of company representatives productivity 1400, adherence 1405, profitability 1410, training 1415, sales 1420, and overall score 1425 to other teams of company representatives. Thus, upon review of the information displayed by the second supervisor graphical interface, the supervisor is aware of how the team of company representatives compares to other teams of company representatives.

The graphical interface can further include additional display elements to visually display assignment of work to company representatives and completion of work and training by company representatives. Additional display elements can display customer satisfaction and/or to display any other information described herein related to company representatives, proficiencies, training, and work.

Figure 15:
FIG. 15 illustrates an example of a first company representative graphical interface.

Referring to FIG. 15, a first company representative graphical interface is illustrated. The first company representative graphical interface includes several display outputs visually displaying real-time information of interest to the company representative. For example, the first company representative graphical interface includes display outputs which compare the company representative's personal productivity 1500, adherence 1505 to specified work requirements, profitability 1510, training 1515, quality 1520, sales 1525, and overall score 1530 to other members of a team of company representatives to which the company representative is a member. Therefore, the first company representative graphical interface provides a company representative with information about how the company representative compares to other members of the team, and whether there are any areas in which the company representative needs to improve. The first company representative graphical interface may also improve the performance of a company representative where the company representative may be motivated to perform at least as well as others in the same team of company representatives.

Figure 16:
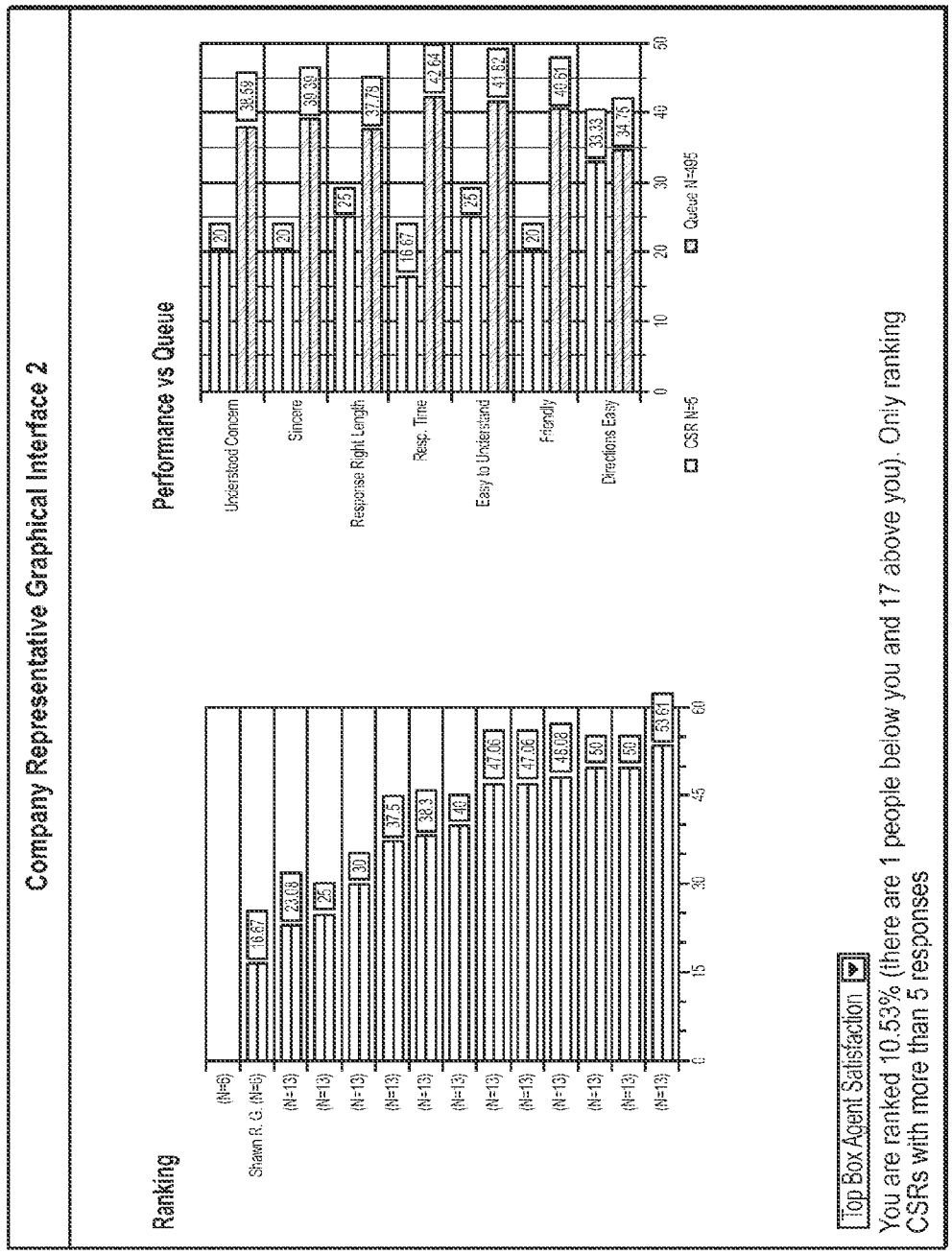
FIG. 16 illustrates an example of a second company representative graphical interface.

FIG. 16 illustrates a second company representative graphical interface. The second company representative graphical interface provides a graphical output visually showing in real-time how the company representative compares with other company representatives in ranking and performance versus queue. The ranking can be an overall score from the first company representative graphical interface. The performance versus queue portion can relate to a comparison of information received from customers and information received by monitoring performance of the company representative.

Thus, the second company representative display output illustrates another manner in which the company representative may be visually presented with any of the information disclosed herein in a manner that fosters a team environment. The second company representative graphical interface also provides feedback to the company representative by identifying areas where the company representative can improve. Moreover, the information display is updated in real-time so that as the company representative improves, completes more training, reduces queue level, improves customer performance, or makes any other changes in the company representative's performance, such changes can be immediately appreciated using such graphical user interfaces.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Detailed descriptions of apparatus and processing techniques known in the field of the invention to one of ordinary skill in the art have been excluded.

We claim:

1. A computer implemented method performed in a contact handling system for delivering training to company representatives, the method comprising the following acts:
a computing system electronically receiving information identifying a company representative in need of training;
the computing system electronically receiving information defining a time parameter for completion of the training;
the computing system automatically scheduling a training session based on the following:
a work schedule for the company representative;
current work requirements, where work requirements is defined by an expected amount or rate of communication media and the work includes servicing the communication media;
expected work requirements;
the time parameter; and
a variable target customer responsiveness score, wherein the variable target customer responsiveness score is associated with a desired maximum or average time in queue for communication media and a relative amount of time spent by customer representatives performing work and completing training wherein training sessions are scheduled when the desired maximum or average time in queue for communication media of the variable target customer responsiveness score is met according to a predetermined criteria and training sessions are automatically canceled when the actual maximum or average time in queue for communication media comes within a predetermined closeness to the desired maximum or average time in queue for communication media of the variable target customer responsiveness score;
receiving an updated variable target customer responsiveness score, wherein the updated variable target customer responsiveness score automatically triggers the cancelation of training sessions already begun by company representatives and automatically reschedules the training sessions for completion at a later date; and
the computing system automatically providing the training session to the company representative as scheduled.

2. A method according to claim 1, further comprising an act of notifying the company representative of the scheduled training session.

3. A method according to claim 2, wherein the act of notifying the company representative of the scheduled training session includes informing the company representative of the training session and the time parameter.

4. A method according to claim 3, wherein the notification includes an automated email, an electronic appointment for insertion in an electronic calendar program, an automated telephone call, an automated text message, an automated facsimile, or other automated communication media.

5. A method according to claim 3, wherein the company representative is notified when the company representative is off-shift.

6. A method according to claim 1, wherein the scheduled training session is electronically provided to the company representative when the company representative is off-shift.

7. A method according to claim 1, wherein the scheduled training session is electronically provided to the company representative when the company representative is on-shift.

8. A method according to claim 7, wherein work is routed to the company representative immediately before and immediately after the time during which the company representative is provided with the training.

9. A method according to claim 8, wherein the work includes communication media to be serviced by the company representative.

10. A method according to claim 8, wherein the work includes communication media to be initiated by the company representative.

11. A method according to claim 1, wherein the time parameter is defined by a target date for completion of the training session or a target amount of time for completion of the training session.

12. A method according to claim 1, further comprising receiving an electronic input specifying an amount of required training session completions in a specified time period.

13. A method according to claim 1, wherein the work requirements includes a number of customer contacts associated with each communication medium.

14. A method according to claim 13, wherein the customer contacts are associated with incoming communications media.

15. A method according to claim 13, wherein the customer contacts are associated with outgoing communications media.

16. A method according to claim 1, further comprising receiving an automated confirmation indicating completion of the training session by the company representative as soon as the training session is completed by the company representative.

17. A method according to claim 16, wherein the training session includes a test, the method further comprising receiving notification of a test score when the training session is completed by the company representative.

18. A method according to claim 17, wherein the score is compared to a training success criteria, wherein the proficiency is selectively assigned to the company representative based on a result of the comparison between the score and the training success criteria.

19. A method according to claim 1, further comprising an act of storing information in a computer-readable media, the information describing a proficiency automatically assigned to the company representative as soon as the company representative completes the training session.

20. A method according to claim 1, further comprising an act of identifying work associated with a work category, comparing the work category with stored information describing company representative proficiencies, and assigning the work to the company representative based on the comparison of the work category and the company representative proficiencies.

21. A method according to claim 1, further comprising requiring authentication prior to updating the variable target customer responsiveness score.

22. A method according to claim 1, wherein the variable target customer responsiveness score is associated with a particular geographic location, and a second variable target customer responsiveness score is associated with a different geographic location.

23. A method according to claim 1, further comprising:
identifying a particular company representative who has not performed work associated with a particular proficiency for a predetermined amount of time; and
assigning maintenance training to the particular company representative to insure that the particular company representative retains the required proficiency.

24. A computer-readable storage media having computer-executable instructions for performing the following acts when executed in a computing system:
a computing system electronically receiving information identifying a company representative in need of training;
the computing system electronically receiving information defining a time parameter for completion of the training;
the computing system automatically scheduling a training session based on the following:
a work schedule for the company representative;
current work requirements, where work requirements is defined by an expected amount or rate of communication media and the work includes servicing the communication media;
expected work requirements;
the time parameter; and
a variable target customer responsiveness score, wherein the variable target customer responsiveness score is associated with a desired maximum or average time in queue for communication media and a relative amount of time spent by customer representatives performing work and completing training wherein training sessions are scheduled when the desired maximum or average time in queue for communication media of the variable target customer responsiveness score is met according to a predetermined criteria and training sessions are canceled when the actual maximum or average time in queue for communication media comes within a predetermined closeness to the desired maximum or average time in queue for communication media of the variable target customer responsiveness score;
receiving an updated variable target customer responsiveness score, wherein the updated variable target customer responsiveness score automatically triggers the cancelation of training sessions already begun by company representatives and automatically reschedules the training sessions for completion at a later date; and
the computing system automatically providing the training session to the company representative as scheduled.

* * * * *